United States Patent [19]
Lara-Castro

[11] Patent Number: 6,164,330
[45] Date of Patent: Dec. 26, 2000

[54] VALVE HAVING A FLOW BLOCKING ROTARY BODY

[76] Inventor: Manuel Lara-Castro, Av. Fuentes del Valle #648 Ote., Colonia Fuentes del Valle, C.P. 66220, San Pedro Garza García, Nuevo León, Mexico

[21] Appl. No.: 09/416,287

[22] Filed: Oct. 12, 1999

[51] Int. Cl.[7] ........................................................ F16K 3/26

[52] U.S. Cl. ......................................... 137/625.31; 251/89

[58] Field of Search ........................ 137/625.31, 625.46; 251/89, 113

[56] References Cited

U.S. PATENT DOCUMENTS

| | | | |
|---|---|---|---|
| 2,196,219 | 4/1940 | Madden | 251/113 |
| 4,098,294 | 7/1978 | Woods | 137/614.11 |
| 4,862,915 | 9/1989 | Renfro | 137/556 |

*Primary Examiner*—John Fox
*Attorney, Agent, or Firm*—Abelman, Frayne & Schwab

[57] ABSTRACT

A valve having a flow blocking rotary system comprising: a main body divided in two body sections, a rotary dosing body to regulate or interrupt the flow of fluid, located between the two body sections and locking means to prevent that an unauthorized person could change the flow rate set for the valve, and by which the rotary dosing body may be set at a desired position to regulate the flow of fluid.

9 Claims, 2 Drawing Sheets

VALVE HAVING A FLOW BLOCKING ROTARY BODY

BACKGROUND OF THE INVENTION

A. Field of the Invention

This invention relates to valves for the control of the flow of fluids (liquids, gases, etc.) and more particularly to a valve having a flow blocking rotary body.

B. Description of the Related Art

Valves are mechanical devices for the control of the flow or pressure of the fluids in a pipeline or between components of a machine. They may be automatic, such as those operated by pressure against a spring behind it, or non-automatic, such as a stop-cock operated by turning a wheel.

The typical complete valve consists of an actuator and a valve body. The body is a pressure tight fitting that contains a variable orifice through which the liquid passes by, and an actuator, which provides the power to move a plug or baffle to vary the flow area of the orifice. The motion of the operator is transmitted through a stuffing box or bellows seal in the body wall to move the valve plug.

The most common types of valve designs are the butterfly valve, diaphragm valve and the sliding-stem body valve.

The butterfly valve comprises a valve body having a plug disc rotary mounted on a shaft passing diametrically trough said disc, changing from an open to a closed state by rotating said plug disc over its own axis. This type of valve has the advantage that it is economical in large sizes and can be rubber lined to provide tight shutoff; however it is not suitable for fluids at a high pressures mainly because the plug disc has a tendency to rotate when a high pressure is applied to the plug disc, causing the valve to open at an undesired rate.

The diaphragm valve comprises a main body having an orifice including an elastic diaphragm which is pushed against the orifice by an actuator in order to interrupt the flow trough the orifice. The diaphragm can be made of many elastic materials which make this type of valve suitable to be used on slurries and or corrosive chemicals but due to the properties of the elastic materials, such as plastic, this type of valve is not suitable to use at high temperatures and pressures due to the tendency of the elastic material to soften and in extreme cases to melt or tear.

The sliding-stem valve is the most commonly used valve, often used in domestic water pipes. This type of valve has many valve body configurations, each having a flow passage inside the valve body and a plug mounted on a threaded sliding stem or actuator which slide inside the valve body and push the plug to the flow passage in order to interrupt the flow trough the passage. Usually, the plug consists of a metallic disc including a rubber seal, both having a suitable configuration adaptable to the shape of the flow passage in order to provide an adequate seal between the plug and the passage walls. This type of valve has the advantage that it is economical, simple and broadly available, but has many disadvantages. One of the most remarkable disadvantages resides on the durability of its components, for example the rubber seal, after some time of use, tends to broke or wear from the edges, causing an inefficient sealing between the plug and the passage, and the threaded sliding stem tends to loose its thread, thus losing its pushing force causing a poor sealing between the seal and the flow passage. Furthermore, as the static pressure that the valve has to bear when it is closed, without leak problems, depends on the force that the operator of the valve applies to the actuator, these operation tends to destroy the rubber seal, requiring continuous replacement thereof.

Considering the above referred problems, applicant developed a valve which:

Is suitable for using with any kind of fluid at any temperature and pressure without leak problems;

Do not depend on the force which the operator has to apply to the stem for fitting the rubber seal on closing the valve to provide a reliable and efficient seal when closed;

Controls and maintains the desired flow of fluid in a reliable way; and

Avoids that an unauthorized person could change the flow rate set for the valve.

Applicant's valve comprises: a solid two-pieces main valve body constituted by a first valve section and a second valve section, each valve section having: a central perforation having means to retain the valve sections against rotation from one another; an internal end and an external end; and one or more fluid passages surrounding the central perforation; the external end including means to be coupled to a pipeline; a rotary dosing body to be coupled between the first valve section and the second valve sections, including: a central perforation; and one or more fluid passages surrounding the central perforation to regulate or interrupt a flow of fluid in association with the fluid passages of the first valve section and second valve section; a shaft, passing through the central perforation of the first valve section, the rotary dosing body and the second valve section, having: two ends; means to firmly coupling the first valve section, the rotary dosing body and the second valve section located at each end; and means to retain the two valve sections against rotation from one another cooperating with the means of the central perforation; and locking means to set a plurality of desired positions of the rotary dosing body to regulate the flow of fluid.

Applicant's valve achieve a longer life than that the actual valves, thanks to the low friction between its components, that is, between the dosing body which is the only movable piece of the valve and the blocking body.

SUMMARY OF THE INVENTION

It is therefore a main objective of the present invention, to provide a valve having a flow blocking rotary system.

It is also a main objective of the present invention, to provide a valve having a flow blocking rotary system, of the above disclosed nature which, thanks to the low friction between its single movable component and the remainder of the components of the valve, has a longer life than that of the actual valves.

It is another main objective of the present invention, to provide a valve having a flow blocking rotary system, of the above disclosed nature, which controls and maintains the desired flow of fluid in a reliable way.

It is still another main objective of the present invention to provide a valve having a flow blocking rotary system, of the above disclosed nature which avoids that an unauthorized person could change the flow rate set for the valve.

It is an additional objective of the present invention to provide a valve having a flow blocking rotary system, of the above disclosed nature which is suitable for using with any kind of fluid at any temperature and pressure without leak problems nor undesirable variance of flow rate.

It is a further main objective of the present invention to provide a valve having a flow blocking rotary system, of the above disclosed nature, which do not depends on the force applied to the closing components, for reliable and efficiently closing the valve.

It is still a further objective of the present invention to provide a valve having a flow blocking rotary system, of the above disclosed nature which is able to bear high pressures without leak problems.

These and other objects and advantages of the valve having a flow blocking rotary system, of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
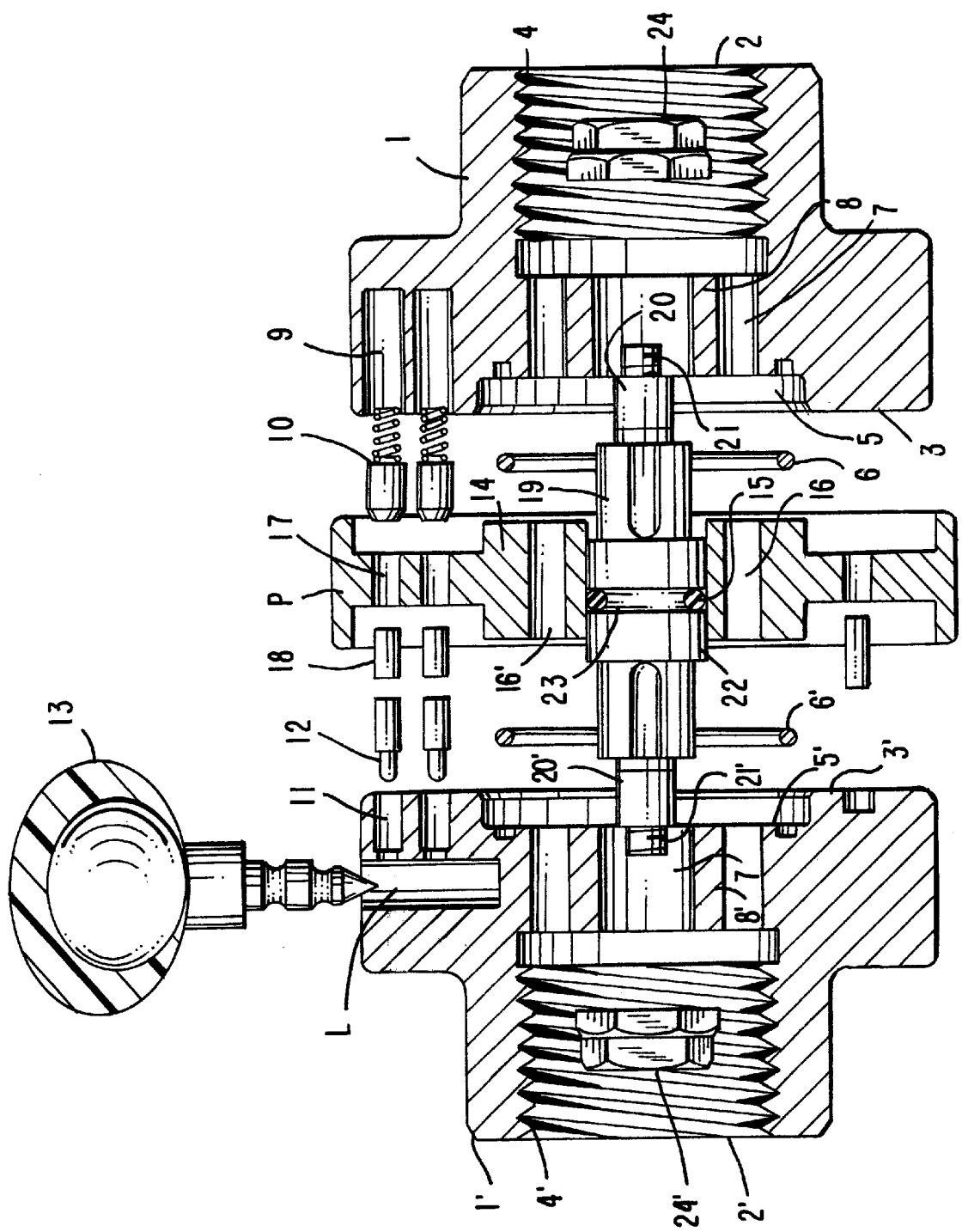
FIG. 1 is a lateral exploded view in longitudinal section of the valve having a flow blocking rotary system of the present invention, showing its internal components.
Figure 2:
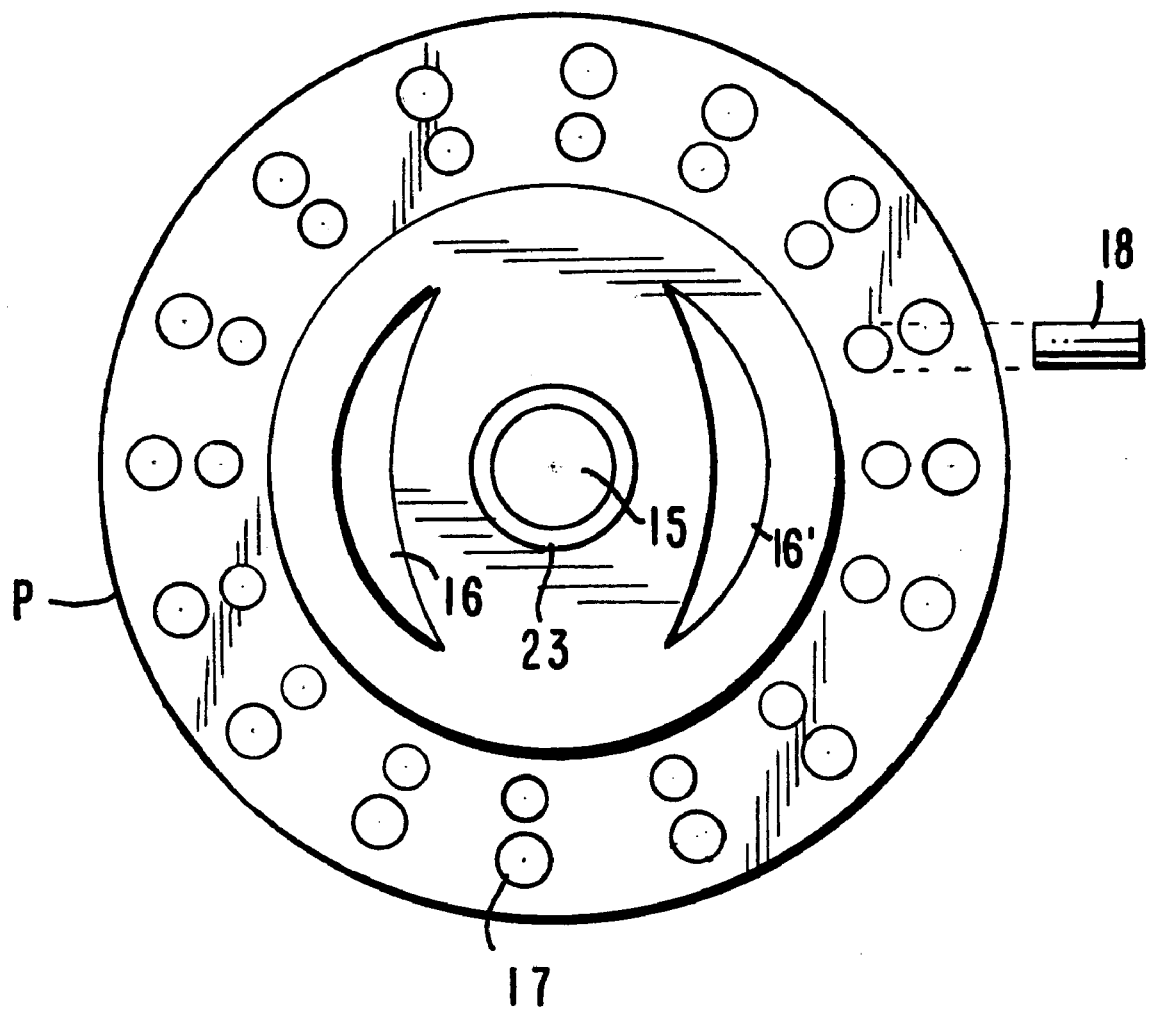
FIG. 2 is a front view of the rotary dosing body having a flow blocking rotary system of the present invention.

The invention will now be described referring to a preferred embodiment thereof, illustrated in the accompanying drawings wherein the same signs and numbers, refer to the same parts of the shown figures.

the valve having a flow blocking rotary system, of the present invention comprises:

a solid two-pieces tubular main valve body constituted by a first valve section 1 and a second valve section 1', each including an external end 2, 2' and an internal end 3,3', respectively;

the external end 2, 2' of the first and second valve sections 1, 1' including means to be coupled to a pipeline or other components (not shown), which in the preferred embodiment illustrated in FIG. 1, consisting in a threaded tubular coupling 4,4';

the internal end 3, 3' of the first and second valve sections 1, 1' having a circular recess 5, 5' receiving an 0 ring 6, 6';

each of the first and second valve sections 1, 1' including a central perforation 7, 7' having retaining means to retain them against rotation from one another, which, in the embodiment shown in FIG. 1, consisting in said central perforation 7, 7' having an hexagonal shaped cross section; and one or more slot shaped water passages 8, 8' surrounding the central perforation 7, 7', said central perforation 7, 7' and said passages 8, 8' passing through all the thickness of the first and second valve sections 1, 1';

the internal end 3 of the first valve section 1 including at least a longitudinal housing 9, to retain locking mechanism including a spring and piston assembly 10;

the internal end 3' of the second valve section 1' including at least a longitudinal perforation 11 including a pin 12 directly meeting with the spring and piston assembly 10 into the housing 9 of the first valve section 1, and a perpendicular perforation L in communication with an internal end of the perforation 11 for an actuating key 13;

an annular rotary dosing body 14, to be coupled between the first and second valve sections 1, 1', having a central perforation 15 coinciding with the central perforation 7, 7' of the first and second valve sections 1, 1', and one or more slot shaped passages 16, 16' surrounding the central perforation 15, coinciding with the slots 8, 8' of the first and second valve sections 1, 1', to regulate or interrupt the flow of fluid in relation to the slots 8, 8' of said first and second valve sections 1, 1' when the dosing body 14 is rotated, and including a annular projection P surrounding the annular rotary dosing body 14 which allows a user to rotate it, having at least a set of a plurality of perforations 17, located at the periphery thereof, each perforation 17 including a locking pin 18, which is representative of a position of the dosing body 14 correspondent to a determined flow rate; and a shaft 19 including a first and a second end 20, 20' each having an hexagonal shape and a threaded head 21, 21', and having a central body 22 including an O ring 23, hermetically passing through the central perforation 15 of the dosing body 14; said shaft 19 passing through the central hexagonal perforation 7, 7' of the first and second valve sections 1, 1' retaining both valve sections against rotation from one another and allowing the threaded head 21, 21' protruding the hexagonal perforation 7, 7', in order to firmly coupling the first valve section, the dosing body 14 and the second valve section to each other, by means of a screw 24, 24' screwed to the threaded head 21, 21';

The spring and piston assembly 10 pushes the pins 12 and 18, constituting locking means, causing that the pin or pins 12 of the annular rotary dosing body 14 remain between the perforations thereof 17 and the perforation of the second valve section 11 preventing the rotation of the rotary dosing body 14, thus preventing that an unauthorized person could change the flow rate set for the valve, and by which the dosing body 14 may be set at a desired position to regulate the flow of fluid in relation with the slots 8, 8' of the valve sections 1, 1'.

Also, the combination of the passage L and the key 13, further constituting the locking means as a safety way to set and operate the flow control by pushing back the coincident pins 12, 18 to its respective perforations 11, 17 allowing the rotation of the annular dosing body.

Although it was described that the means to couple the valve to a pipeline consist of a threaded tubular coupling 4,4', it may be a clamp or any other similar o equivalent mean (not shown).

And although it was described that the retaining means to retain the first and second valve sections against rotation from one another consists of a central perforation 7,7' having an hexagonal shaped cross section receiving an hexagonal end 20, 20' of the shaft 19, the central perforation of the first and second valve sections and the ends of the shaft may have any polygonal shape, or may have a circular shape and additionally providing means such as a bolt passing trough perforations at the shaft and both valve sections, to avoid the rotational movement thereof.

Finally it must be understood that the valve having a flow blocking rotary system of the present invention, is not limited exclusively to the above described and illustrated embodiments and that the persons having ordinary skill in the art can, with the teaching provided by this invention, to make modifications to the design and component distribution of the valve having a flow blocking rotary system, which will clearly be within the true inventive concept and scope of the invention which is claimed in the following claims.

What is claimed is:

1. A valve having a flow blocking rotary system comprising:

a) a solid two-pieces main valve body constituted by a first valve section and a second valve section, each valve section having:
   a central perforation having means to retain the valve sections against rotation from one another;
   an internal end and an external end; and
   one or more fluid passages surrounding the central perforation;
   the external end including means to be coupled to a pipeline;
b) a rotary dosing body to be coupled between the first valve section and the second valve sections, including:
   a central perforation; and
   one or more fluid passages surrounding the central perforation to regulate or interrupt a flow of fluid in association with the fluid passages of the first valve section and second valve section;
c) a shaft, passing through the central perforation of the first valve section, the rotary dosing body and the second valve section, having:
   two ends;
   means to firmly coupling the first valve section, the rotary dosing body and the second valve section located at each end; and
   means to retain the two valve sections against rotation from one another cooperating with the means of the central perforation.

2. The valve of claim 1, including locking means to set a plurality of desired positions to regulate the flow of fluid.

3. The valve of claim 1, wherein the means to be coupled to a pipeline consist of a threaded tubular coupling.

4. The valve of claim 1, wherein the means to be coupled to a pipeline consist of a clamp.

5. The valve of claim 1, wherein the means to firmly coupling the first valve section, the rotary dosing body and the second valve section comprises a threaded head and a screw.

6. The valve of claim 1, wherein the means to prevent the rotation of the two valve sections located at the perforations of each valve section and the shaft comprises respectively a polygonal cross section and head having the same polygonal shape as the polygonal cross section of the perforation.

7. The valve of claim 1, wherein the means to prevent the rotation of the two valve sections located at the perforation of each valve section and the shaft comprises a bolt located at each end of the shaft passing trough a perforation located at the perforation of each valve section.

8. The valve of claim 1, wherein the locking means comprising:
   at least a set of a plurality of perforations, located at the periphery of the rotary dosing body, each perforation including a locking pin, which is representative of a position of the dosing body correspondent to a determined flow rate;
   at least a longitudinal perforation located at the second valve section, including a pin, meeting with a pin or pins located at the perforations of the rotary dosing body;
   at least a longitudinal housing, located at the internal end of the first valve section to retain a spring and piston assembly which pushes the pins located at the perforation or perforations of the second valve section and the pin or pins located at the perforations of the rotary dosing body, out of its positions, thus locking the rotary dosing body.

9. The valve of claim 1 wherein the locking means further including a perpendicular perforation in communication with an internal end of the longitudinal perforation, located at the second valve section for an actuating key which pushes the pins located at the perforation or perforations of the second valve section and the pin or pins located at the perforations of the rotary dosing body back to its positions into its respective perforations, thus allowing the rotary dosing body to rotate.

* * * * *